United States Patent [19]

Duff

[11] Patent Number: 4,662,303

[45] Date of Patent: May 5, 1987

[54] FISHING BOAT WITH INTEGRAL TACKLE BOX

[76] Inventor: Bill Duff, Box 136, Chavies, Ky. 41727

[21] Appl. No.: 714,977

[22] Filed: Mar. 22, 1985

[51] Int. Cl.⁴ .............................................. B63B 11/02
[52] U.S. Cl. .................................................... 114/343
[58] Field of Search ............... 114/343, 363, 364, 356, 114/355, 357; 43/4, 4.5; 224/273

[56] References Cited

U.S. PATENT DOCUMENTS

| | | | |
|---|---|---|---|
| 3,606,447 | 9/1971 | Ryding | 224/273 |
| 3,871,043 | 3/1975 | Davidson et al. | 114/356 |
| 3,943,586 | 3/1976 | Palmer | 114/356 |
| 4,033,280 | 7/1977 | Wood et al. | 114/255 |

FOREIGN PATENT DOCUMENTS 80980  5/1982  Japan .................................. 114/357

*Primary Examiner*—Galen Barefoot
*Assistant Examiner*—Jesûs D. Sotelo
*Attorney, Agent, or Firm*—Eugene M. Bond

[57] ABSTRACT

A fishing boat having an integral tackle box is disclosed, the tackle box being customed positioned along the gunwale near the raised fore deck along the bow. The tackle box is disposed rearwardly from the raised fore deck, the integral tackle box having a height approximating the height of the raised fore deck.

1 Claim, 4 Drawing Figures

FISHING BOAT WITH INTEGRAL TACKLE BOX

BACKGROUND OF THE INVENTION

Numerous prior art tackle boxes are available for fishermen. However, with the development of modern small lake fishing boats, portable tackle boxes have become more of an obstacle to efficient fishing. In instances where integral compartments are provided, the intended usage has been for boating equipment as opposed to fishing gear.

STATEMENT OF THE INVENTION

Generally stated, the present invention provides a fishing boat having an integral tackle box which is custom positioned such to provide an efficient, readily accessible storage means which does not interfere with fishing practices.

DETAILED DESCRIPTION OF THE PRESENT INVENTION

Practice of the present invention will be more fully appreciated by the following detailed description taken in conjunction with the figures wherein similar elements are identified by similar numbers throughout the several views.

Figure 1:
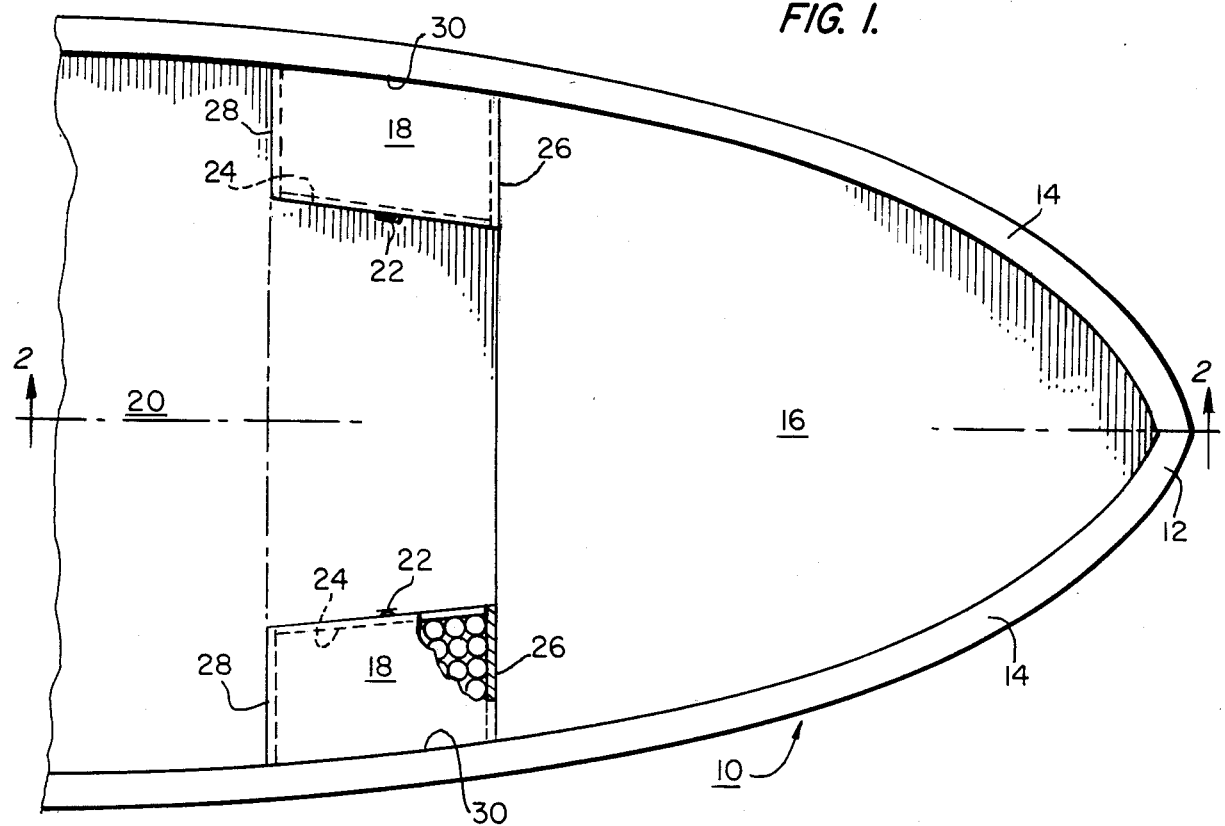
FIG. 1 is a fragmentary top plan view of the bow of a fishing boat with integral tackle boxes of the present invention illustrated in place.

FIG. 1 illustrates the fragmentary portion of fishing boat 10 having bow 12 with gunwale 14 projecting rearwardly, and enclosing a raised fore deck 16. Integral with the fishing boat 10 is tackle box 18 disposed along the gunwale and rearwardly from the raised fore deck 16 into the mid deck 20 with a tackle box height approximating the height of the raised fore deck 16.

Tackle box 18 may be constructed of a waterproof durable plastic which is also wormproof. The tackle box includes a latch 22 along pivotal vertical closure door 24. Tackle box 18 is integral with raised fore deck 16 along one edge 26 with the rear edge 28 forming the rear exposed portion thereof. Tackle box 18 is also integral with the gunwale 14 along surface 30.

Figure 2:
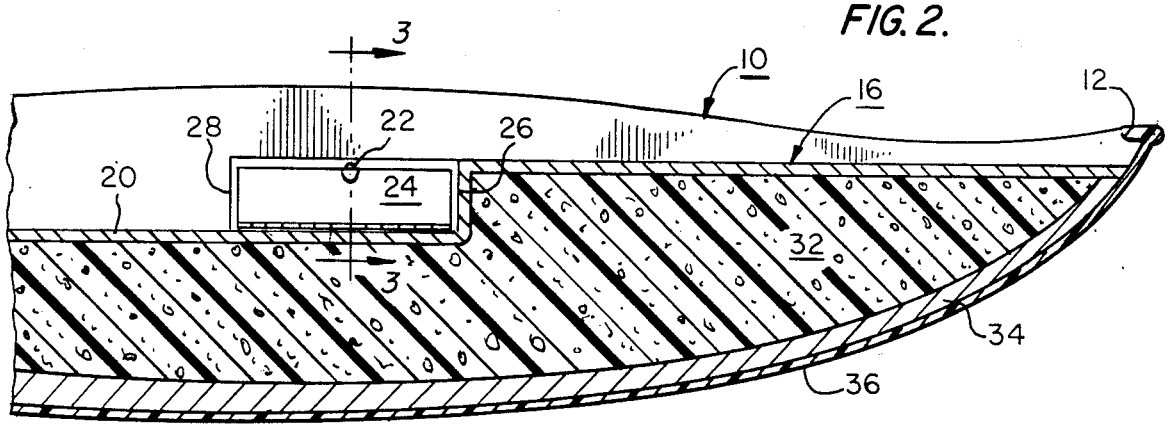
FIG. 2 is a vertical cross-sectional view taken along line 2—2 of FIG. 1 illustrating the fishing boat having an integral tackle box in front elevational view.

FIG. 2 further illustrates the fishing boat 10 with integral tackle box 18. Positive flotation foam 32 is illustrated within the raised fore deck 16, and keelson 34 over keel 36.

Figures 3, 4:
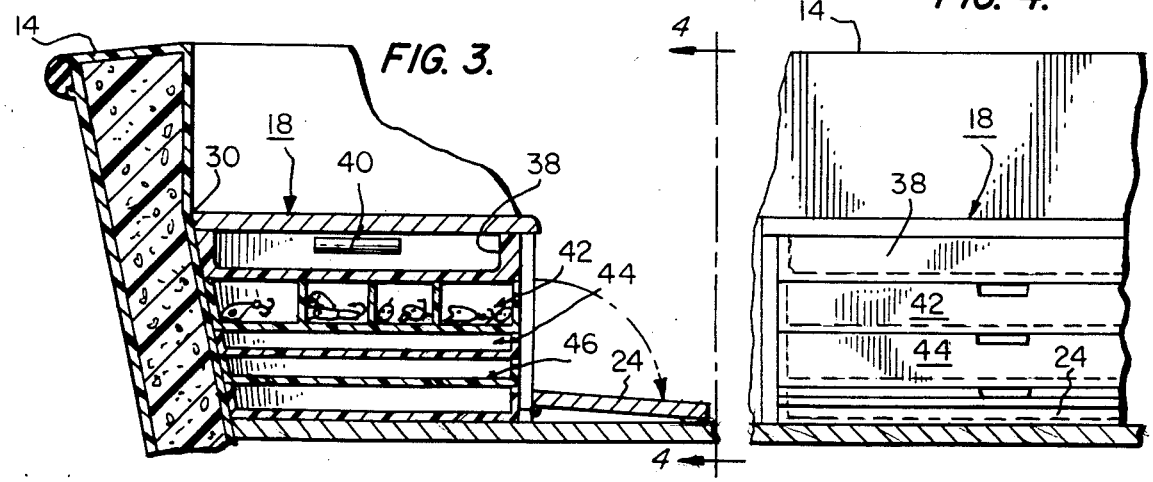
FIG. 3 is a fragmental cross-sectional view taken along line 3—3 of FIG. 2 illustrating the integral tackle box in greater detail.
FIG. 4 is a fragmental view of the integral tackle box taken along line 4—4 of FIG. 3.

Tackle box 18 is illustrated in greater detail in FIGS. 3 and 4. In particular, door 24 is shown in the open position, with removable caddy 38, light 40 positioned along the top of the box, with slotted slidable trays 42, 44 and 46, in any convenient number positioned thereunder.

In use, door 24 may be pivoted to the open position, the trays or caddy slide from closed position to open position for removal of a selected item, after which the trays or caddy are returned to the closed position. Accordingly, a compact, efficient fishing tackle box is included integral with the fishing boat such that the tackle box is out of interferring position during fishing and yet accessible to the fisherman's demands as needed.

The fishing box includes sectional dividers which may be configured in different lengths depending on the size of the boat, using one piece dividers which are held in place by end to end slots.

Storage of baits etc. are easily placed at the fisherman's fingertips under his legs within the tackle box 18.

The lid of the tackle box 18 includes a caddy type holder useful for maps, lines, tools, knives, etc. with a courtesy light useful for night fishing. The lid may be usefully constructed from marine plywood of a size as required.

The sliding trays are included to further contain items during fishing trips.

It will be apparent to those skilled in the art, that numerous additions and modifications may be made in practice of the present invention without departing from the spirit of the invention as defined herein and as claimed subsequently.

What is claimed is:

1. In a small fishing boat having a raised fore deck near the bow with a gunwale projecting therefrom, the improvement which consists essentially of, in combination, integral tackle boxes disposed along the gunwale, integrally and rearwardly extending from the raised fore deck and on opposite sides of the longitudinal centerline of said boat, the integral tackle boxes having a height approximating the height of the raised fore deck and projecting into the mid-deck of the boat with a fixed distance from the gunwale, said integral tackle boxes having a door pivotally hinged along a surface opposite the gunwale and opening into the mid-deck, the tackle boxes having trays disposed therein, and a light positioned along the top interior of the box, whereby compact, efficient fishing tackle boxes are included integral with the fishing boat and out of interfering position during fishing and with access thereto as needed.

* * * * *